(12) United States Patent
Malkin

(10) Patent No.: US 6,272,145 B1
(45) Date of Patent: Aug. 7, 2001

(54) METHOD AND APPARATUS FOR COMMUNICATING DATA ACROSS MULTIPLE COMMUNICATION LINKS

(75) Inventor: Gary S. Malkin, Lowell, MA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/110,104

(22) Filed: Jul. 1, 1998

(51) Int. Cl.$^7$ .............................. H04J 32/26; H04L 12/28; H04L 12/56; H04L 12/66
(52) U.S. Cl. ....................... 370/432; 370/352; 370/396; 370/410; 709/225; 709/226
(58) Field of Search ................................. 370/389, 347, 370/352, 396, 392, 432, 275, 410; 709/203, 224, 223, 225, 226

(56) References Cited

U.S. PATENT DOCUMENTS

| | | | |
|---|---|---|---|
| 5,606,561 | * | 2/1997 | Scheibel, Jr. et al. ................ 370/347 |
| 6,147,987 | * | 11/2000 | Chau et al. ........................... 370/352 |
| 6,185,601 | * | 2/2001 | Wolff .................................... 709/203 |

OTHER PUBLICATIONS

A. Valencia, et al.; Layer Two Tunneling Protocol "L2TP"; Mar. 1998; pp. 1–83.*
W. Simpson; The Point–to–Point Protocol (PPP); Jul. 1994; pp. 1–44.*

* cited by examiner

Primary Examiner—Hassan Kizou
Assistant Examiner—John Pezzlo
(74) Attorney, Agent, or Firm—Blakely Sokoloff; Taylor & Zafman LLP

(57) ABSTRACT

A system is provided for identifying a bundle head in response to a request to establish a multilink connection. The system determines an endpoint identifier associated with the received connection request. A message is then generated to identify other devices servicing the same endpoint identifier. A random number is also generated by the system. The random number is included in the message generated to identify other devices servicing the same endpoint identifier. The current device is established as bundle head for the endpoint identifier if a timeout period expires and the random number generated by the current device is lower than random numbers generated by other devices. A message is broadcast indicating that the current device is the bundle head for the endpoint identifier if a timeout period expires and no other device is identified as servicing the same endpoint identifier. When the current device is established as bundle head for the endpoint identifier, the endpoint identifier is stored in a table contained within the current device. The current device also stores an arithmetic sum associated with the endpoint identifier in the table contained within the current device.

25 Claims, 7 Drawing Sheets

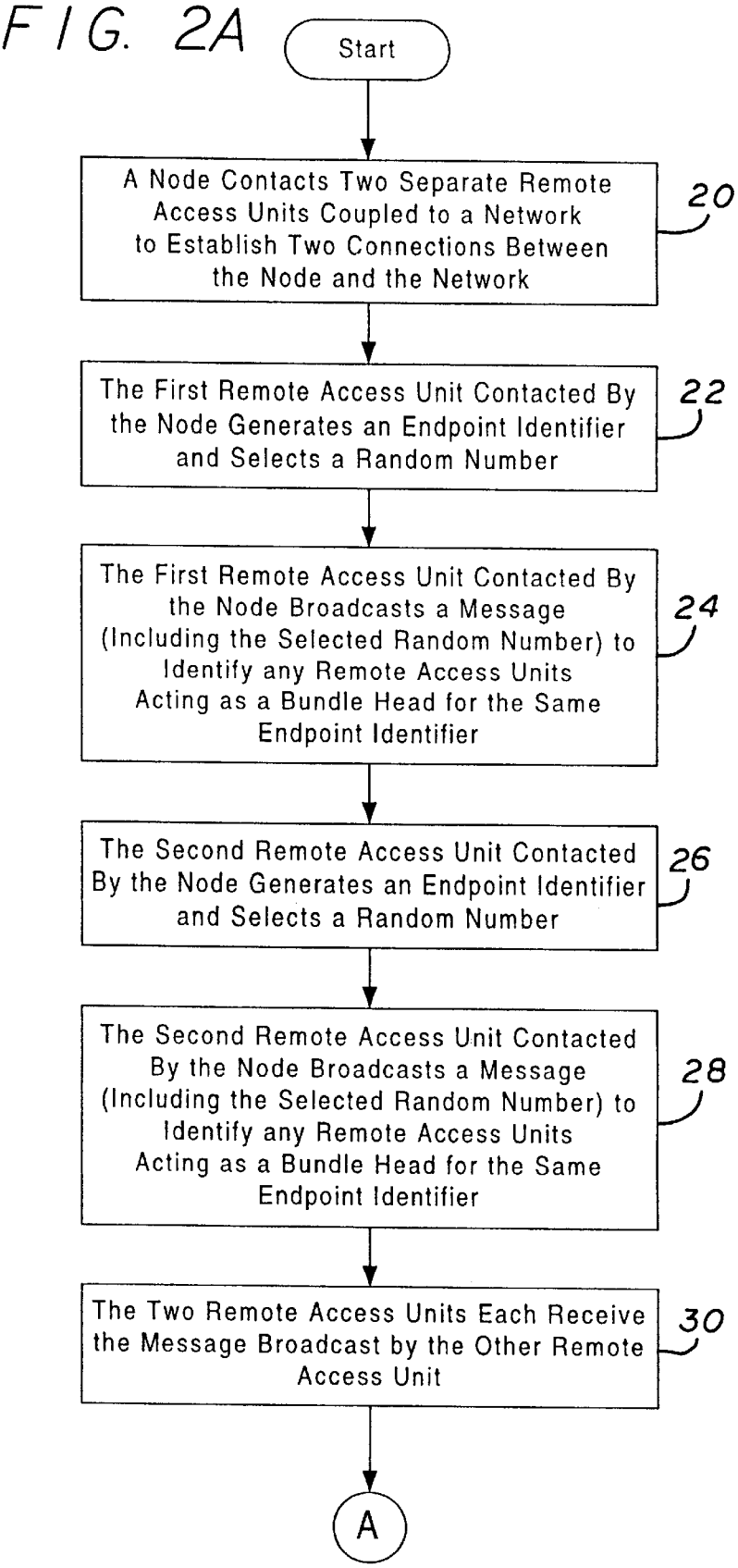

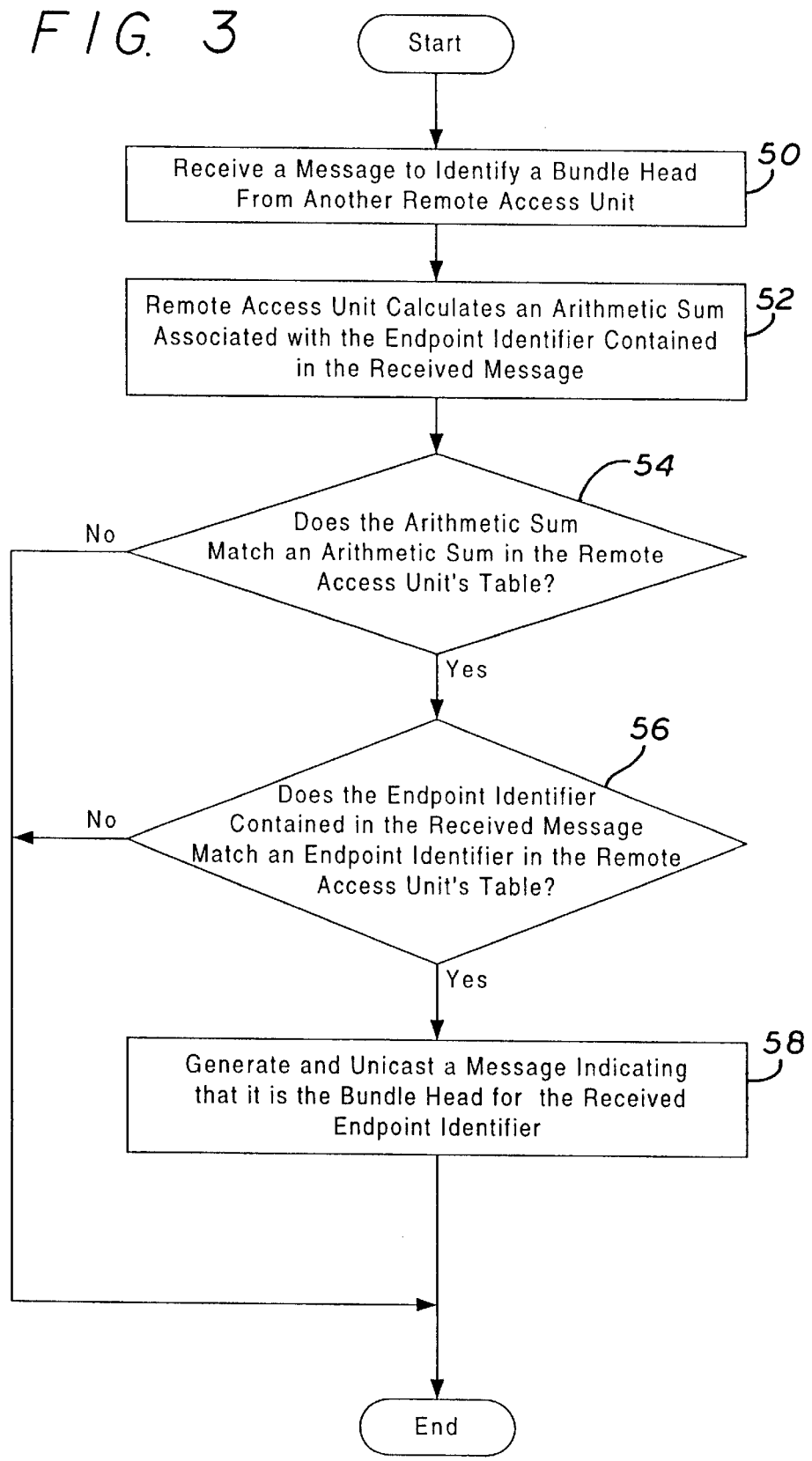

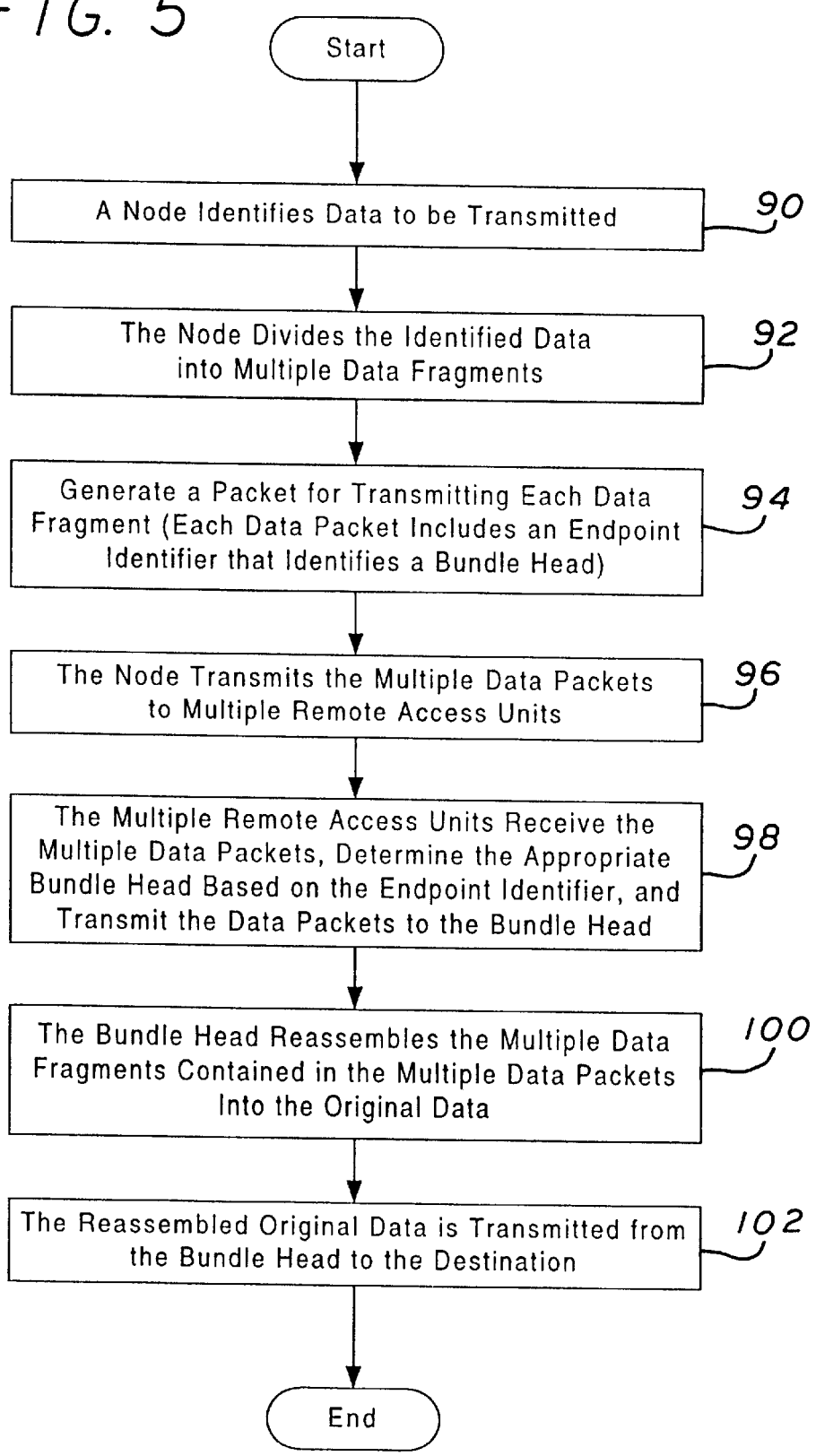

METHOD AND APPARATUS FOR COMMUNICATING DATA ACROSS MULTIPLE COMMUNICATION LINKS

FIELD OF THE INVENTION

The present invention relates to data communication networks. More specifically, the invention provides a system for identifying a bundle head to reassemble data fragments transmitted across multiple communication links.

BACKGROUND

Data communication networks are capable of communicating various types of information between two or more devices coupled to the network. In certain situations, a device may transmit data to a destination by utilizing multiple communication links simultaneously. This is often referred to as multilink communication. For example, a remote data source may transmit data to a remote access unit across multiple communication links simultaneously, in which each communication link is coupled between the remote access unit and the remote data source. By using multiple communication links, the data can be transmitted faster than with a single communication link. Additionally, when multiple communication links are used, a single slow link has less affect on the overall data throughput because other communication links with better throughput can handle a greater portion of the data.

In existing systems, the multiple communication links are coupled between a single remote access unit and the remote data source. If the single remote access unit is approaching its data handling capacity, then the throughput on all of the multiple communication links may be reduced due to the limitations of the remote access unit. To avoid this problem, it is desirable to establish communication links between the remote data source and two or more remote access units. In this type of configuration, if one of the remote access units is approaching its data handling capacity, the transmission of data can be shifted to another remote access unit (using another communication link) having greater available resources. However, in existing systems, when data is transmitted to two or more remote access units, the multiple remote access units do not have any mechanism for reassembling the received data into its original form. Although one of the remote access units may be designated as the unit responsible for reassembling the data, existing systems do not have the ability to locate that designated unit or to transmit data from one remote access unit to another.

It is therefore desirable to provide a system capable of establishing and identifying bundle heads that are responsible for reassembling data received by multiple remote access units across multiple communication links.

SUMMARY OF THE INVENTION

An embodiment of the invention provides a system that identifies a bundle head in response to a request to establish a multilink connection. The system determines an endpoint identifier associated with the received connection request. A message is generated to identify other devices servicing the same endpoint identifier. The current device is established as bundle head for the endpoint identifier if a timeout period expires and no other device is identified as servicing the same endpoint identifier.

In a particular embodiment of the invention, the system generates a random number that is included in the message generated to identify other devices servicing the same endpoint identifier. The current devices is established as bundle head if a timeout period expires and the random number generated by the current device is lower than random numbers generated by other devices.

Another embodiment of the invention broadcasts a message indicating that the current device is the bundle head for the endpoint identifier if a timeout period expires and no other device is identified as servicing the same endpoint identifier.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIGS. 2A and 2B represent a flow diagram illustrating an embodiment of a procedure for identifying a bundle head.

FIG. 3 is a flow diagram illustrating an embodiment of a procedure for identifying matching endpoint identifiers.

FIG. 5 is a flow diagram illustrating an embodiment of a procedure for transmitting data from a source to a destination across multiple communication links.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Embodiments of the present invention provide a method and apparatus for establishing bundle heads and identifying existing bundle heads that are responsible for reassembling data received by multiple remote access units across multiple communication links. The present provides for the transmission of data from a remote data source to multiple remote access units across multiple communication links and properly reassembled by the bundle head and communicated to the data destination.

Figure 1:
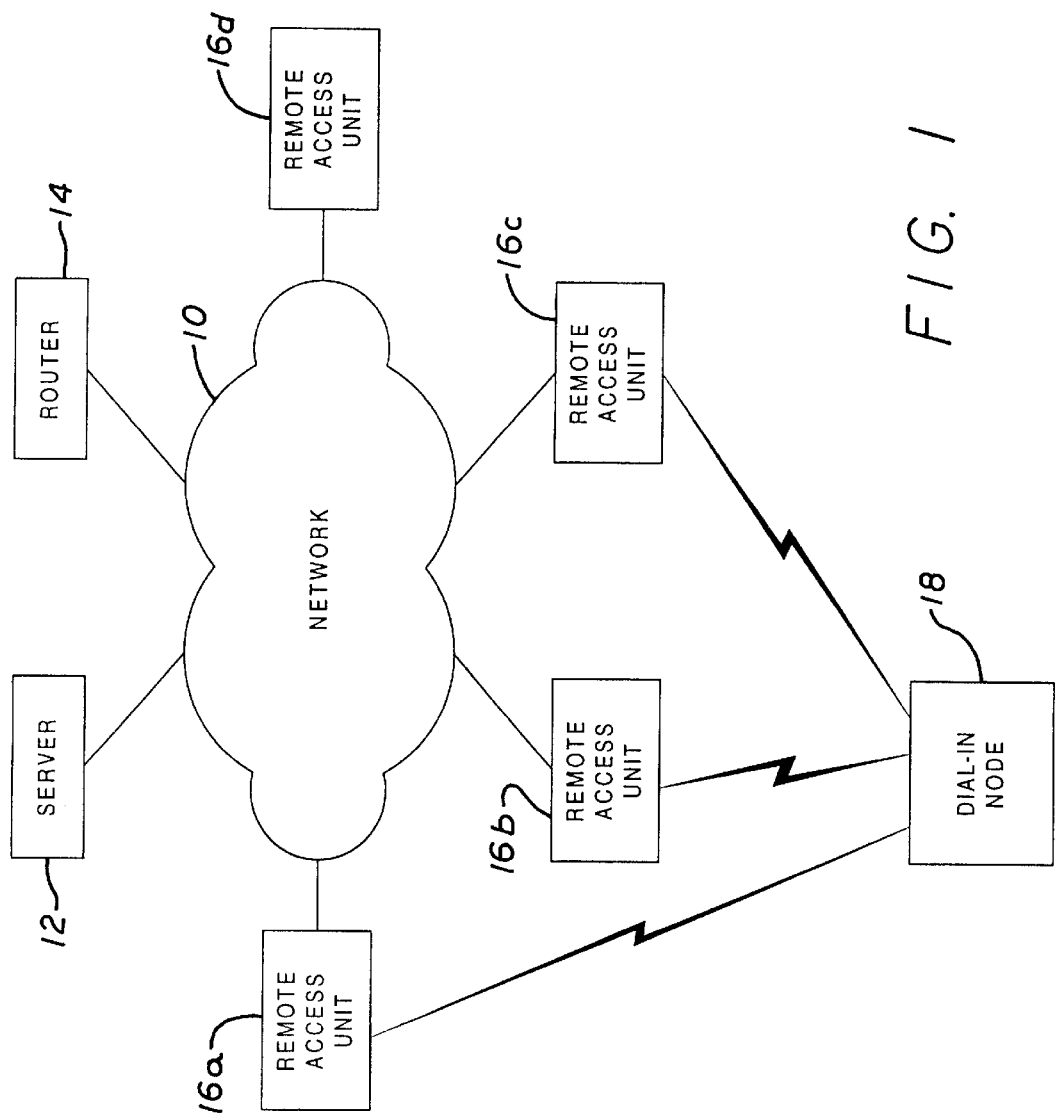
FIG. 1 illustrates an embodiment of a network environment in which the present invention can be implemented.

FIG. 1 illustrates an embodiment of a network environment in which the present invention can be implemented. Network 10 may be a local area network (LAN), a wide area network (WAN), or any other type of data communication network utilizing various topologies and various communication protocols. A variety of different network devices may be coupled to network 10. In the example of FIG. 1, a server 12 and a router 14 are coupled to network 10. Although not shown in FIG. 1, router 14 may be coupled to one or more other networks, thereby providing a communication mechanism for communicating data between network 10 and one or more other networks.

Four remote access units 16a, 16b, 16c, and 16d are coupled to network 10. Remote access units 16a–16d provide a mechanism for remote systems (e.g., dial-in nodes) to communicate with other devices coupled to network 10. A dial-in node 18 shown in FIG. 1 is coupled to three remote access units 16a, 16b, and 16c. Dial-in node 18 may be a microprocessor-based system (e.g., a computer) using a modem or other data communication device to establish a connection between dial-in node 18 and remote access units 16a–16c. The connections established between dial-in node 18 and remote access units 16a–16c may use any type of communication medium, such as conductors (e.g., wires or fiber optic conductors), radio-frequency transmissions, or microwave transmissions. In a particular embodiment of the invention, dial-in node 18 includes a modem coupled to multiple telephone lines. In this embodiment, dial-in node 18 communicates with remote access units 16a, 16b, and 16c using the telephone lines. Signals are communicated across the telephone lines through a public switched telephone network (PSTN) or other communication mechanism, and received by the appropriate remote access unit 16a–16c. The remote access unit 16a–16c then communicates the received signals across network 10. Similarly, signals received by remote access units 16a–16c, and destined for dial-in node 18, are communicated across the PSTN or other communication mechanism to dial-in node 18.

By establishing three separate communication links between dial-in node 18 and network 10, dial-in node 18 is able to distribute the data transmission load between the three different communication links. For example, if one communication link is providing slow throughput, the data transmission load on the slow communication link can be shifted to one or both of the other communication links. Thus, a slow communication link or a slow remote access unit may not significantly affect the overall data throughput.

The embodiment illustrated in FIG. 1 allows dial-in node 18 to transmit a stream of data across the multiple communication links to network 10. As discussed in greater detail below, the stream of data can be divided into multiple fragments and communicated simultaneously to multiple remote access units 16a–16c. Remote access units 16a–16c then reassemble the multiple fragments to create the original stream of data. As discussed below, one of the remote access units 16a–16c functions as a "bundle head" and has the responsibility for reassembling the multiple fragments in the proper order.

Although FIG. 1 illustrates a single dial-in node 18 coupled to three different remote access units 16a–16c, it will be appreciated that multiple dial-in nodes can be coupled to the same remote access unit. Furthermore, a particular dial-in node can be coupled to any number of remote access units.

In another embodiment of the invention, dial-in node 18 is coupled to multiple remote access units that are coupled to different networks. For example, dial-in node 18 is be coupled to a first remote access unit coupled to a first network, and also coupled to a second remote access unit coupled to a second network. This configuration allows dial-in node 18 to communicate with both networks through the two remote access units.

Figure 2B:
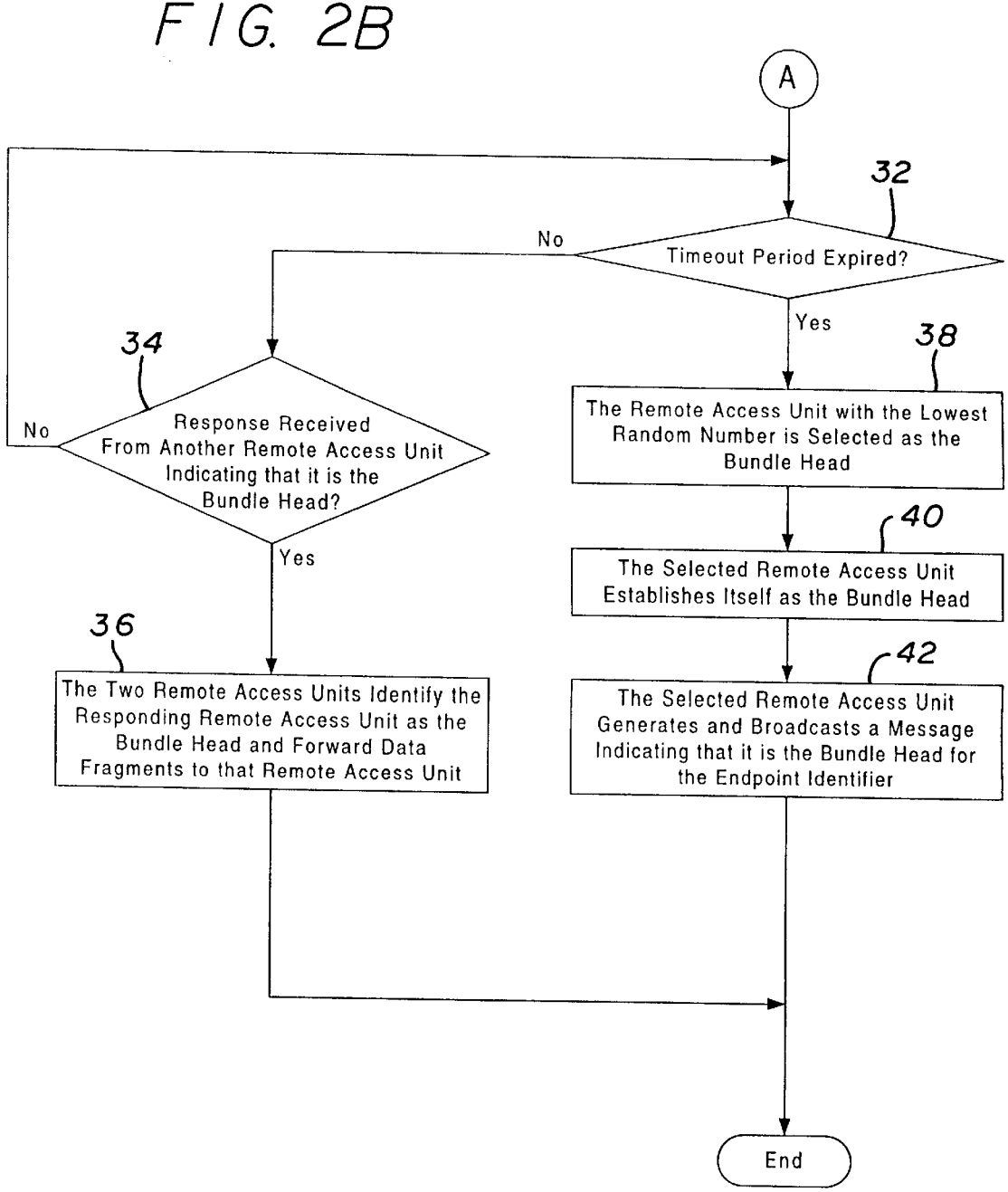

FIGS. 2A and 2B represent a flow diagram illustrating an embodiment of a procedure for identifying a bundle head. In the flow diagram of FIGS. 2A and 2B, two separate communication links are established by a node (e.g., dial-in node 18 shown in FIG. 1). However, the procedure illustrated in FIGS. 2A and 2B can be applied to nodes establishing any number of communication links between the node and one or more remote access units. At step 20, a node contacts two separate remote access units coupled to a network. For example, a multilink connection request may be communicated to both remote access units to request a connection between the node and the remote access units. A communication link is then established between the node and each remote access unit, thereby establishing two communication links between the node and the network. At step 22, the first remote access unit contacted by the node generates an endpoint identifier and selects a random number. The endpoint identifier identifies the dial-in node providing data to one or more remote access units, and the remote access unit contacted by the dial-in node. The random number is used as discussed below to select a particular remote access unit as a bundle head. Those of ordinary skill in the art will appreciate that any type of random number, random character, or similar mechanism can be used to select a bundle head from multiple remote access units.

At step 24, the first remote access unit contacted by the node broadcasts a message to other remote access units. The broadcast message includes the random number selected in step 22 and the endpoint identifier generated in step 22. The broadcast message is used to identify any other remote access unit that is acting as a bundle head for the same endpoint identifier. A single remote access unit is selected as the bundle head for a particular endpoint identifier. The bundle head is responsible for reassembling multiple data fragments received by multiple remote access units.

At step 26, the second remote access unit contacted by the node generates an endpoint identifier and selects a random number. Since the second remote access unit is receiving data from the same node, the endpoint identifier generated by the second remote access unit is identical to the endpoint identifier generated by the first remote access unit. At step 28, the second remote access unit contacted by the node broadcasts a message to identify any remote access units acting as a bundle head for the same endpoint identifier. The broadcast message includes the endpoint identifier and random number selected in step 26. At step 30, the two remote access units each receive the messages broadcast by the other remote access unit. Additionally, other remote access units may receive the broadcast messages. If another remote access unit is already acting as the bundle head for the endpoint identifier contained in the broadcast message, then the remote access unit unicasts a response to the broadcasting remote access unit indicating that it is the bundle head for the endpoint identifier. The remote access unit acting as the bundle head for a particular endpoint identifier may be coupled to the same network as other remote access units servicing the same data stream, or may be located on a different network. If the remote access units servicing the same data stream (identified by the same endpoint identifier) are located on different networks, the networks are coupled together to allow communication of data between the two networks.

At step 32 (FIG. 2B), the procedure determines whether a timeout period has expired. The timeout period is set such that a response from another remote access unit acting as the bundle head for the endpoint identifier contained in the broadcast message is received by the two remote access units (contacted in step 20) before either of the two remote access units establishes itself as a bundle head for the endpoint identifier. If the timeout period has not expired, then the procedure branches to step 34, which determines whether a response has been received from another remote access unit indicating that it is the bundle head for the endpoint identifier. If no response has been received, the procedure returns to step 32 to check the timeout period again. If a response has been received at step 34, the procedure continues to step 36, where the two remote access units (contacted in step 20) identify the responding remote access unit as the bundle head for the endpoint identifier. The two remote access units then forward data fragments associated with the endpoint identifier to the responding remote access unit for reassembly.

If the timeout period has expired in step 32, then the procedure continues to step 38. If the timeout period expires, then there is no other remote access unit currently acting as the bundle head for the endpoint identifier. In this situation, one of the two remote access units (contacted in step 20) is selected as the bundle head for the endpoint identifier. At step 38, the remote access unit with the lowest random number is selected as the bundle head. The random numbers were selected in step 22 for the first remote access unit and in step 26 for the second remote access unit. If, by chance, the two random numbers are the same, then the remote access unit with the lowest Internet Protocol (IP) address is selected as the bundle head. At step 40, the selected remote access unit establishes itself as the bundle head for the endpoint identifier. Each remote access unit contains a table or other data structure that stores information regarding the endpoint identifiers for which the remote access unit is the bundle head. Thus, at step 40, the selected remote access unit stores the endpoint identifier in its table or other data structure. Additionally, the selected remote access unit calculates an arithmetic sum associated with the endpoint identifier and stores the arithmetic sum in the table or other data structure. Additional details regarding the calculation of the arithmetic sum are provided below.

At step 42, the selected remote access unit generates and broadcasts a message to other remote access units indicating that the selected remote access unit is the bundle head for the endpoint identifier. In response to this broadcast message, all other remote access units forward data associated with the endpoint identifier to the selected remote access unit for reassembly.

FIG. 3 is a flow diagram illustrating an embodiment of a procedure for identifying matching endpoint identifiers. At step 50, a remote access unit receives a message to identify a bundle head from another remote access unit. At step 52, the remote access unit that received the message calculates an arithmetic sum associated with the endpoint identifier contained in the received message. The arithmetic sum (modulo $2^6$) is calculated by adding together the unsigned octets of the endpoint identifier. The arithmetic sum is used to perform a quick check of the table in the remote access unit to determine whether a particular endpoint identifier is stored in the table.

At step 54, the procedure determines whether the calculated arithmetic sum matches an arithmetic sum already stored in the remote access unit's table. If a match is not identified at step 54, then the procedure terminates because the endpoint identifier contained in the received message is not stored in the remote access unit's table and, therefore, the remote access unit is not the bundle head for that endpoint identifier. By using the arithmetic sum (a 16-bit number) for matching, the comparison process is faster than comparing the eight-value endpoint identifier with every other endpoint identifier stored in the remote access unit's table.

If a match is identified in step 54, then the procedure continues to step 56 to determine whether the endpoint identifier contained in the received message matches an endpoint identifier in the remote access unit's table. A match in step 54 indicates a likelihood that the endpoint identifier is contained in the remote access unit's table. However, several different endpoint identifiers may generate the same arithmetic sum. Therefore, even though the arithmetic sums matched in step 54, the actual endpoint identifiers must be compared to be certain that the remote access unit is the bundle head for the endpoint identifier. If step 56 determines that the endpoint identifier contained in the received message does not match an endpoint identifier contained in the remote access unit's table, then the procedure terminates because the remote access unit is not the bundle head for the endpoint identifier.

If step 56 determines that the endpoint identifier contained in the received message matches an endpoint identifier contained in the remote access unit's table, then the procedure continues to step 58. At step 58, the remote access unit generates and unicasts a message indicating that it is the bundle head for the received endpoint identifier. This message instructs the other remote access unit where to transmit data fragments associated with the endpoint identifier.

Figure 4A:
FIG. 4A illustrates an embodiment of a discovery message packet format used in identifying a bundle head.

FIG. 4A illustrates an embodiment of a discovery message packet format used in identifying a bundle head. A packet 70 includes a type field, which indicates whether the message is a query or a response. A length field in packet 70 indicates the length of the endpoint identifier field. The random ID field contains the random number that the remote access units use to select the bundle head. The endpoint identifier field contains the endpoint identifier values, described below. Packet 70 can be used to send broadcast messages to other remote access units or to respond to a received broadcast message.

Figure 4B:
FIG. 4B illustrates an embodiment of an endpoint identifier format.

FIG. 4B illustrates an embodiment of an endpoint identifier format. An endpoint identifier 80 includes three fields 80a, 80b, and 80c which are used to identify the dial-in node providing data to one or more remote access units. Remote class field 80a identifies the type of data that is contained in remote data field 80c. Remote length field 80b identifies the length of the data contained in remote data field 80c. The data contained in remote data field 80c identifies a particular dial-in node. The next three fields 80d, 80e, and 80f in endpoint identifier 80 are used to identify the remote access unit contacted by the dial-in node. Local class field 80d identifies the type of data contained in local data field 80f. Local length field 80e identifies the length of the data contained in local data field 80f. The data contained in local data field 80f identifies a particular remote access unit or group of remote access units sharing a common rotary. The last two fields 80g and 80h identify the remote user (i.e., the user of the dial-in node). User name length field 80g identifies the length of the user name data field 80h. User name data field 80h contains the name or identity of the remote user.

FIG. 5 is a flow diagram illustrating an embodiment of a procedure for transmitting data from a source to a destination across multiple communication links. Various protocols can be used to communicate data from a source (e.g., a dial-in node) to a destination (e.g., a node or device coupled to a common network). In a particular embodiment of the invention, Layer Two Tunneling Protocol (L2TP) (PPP Working Group, Internet Draft, draft-ietf-pppext-12tp-10.txt, March 1998) is used to communicate data between a source and a destination. At step 90 of FIG. 5, a node (e.g., dial-in node 18 in FIG. 1) identifies data to be transmitted to a destination. At step 92, the node divides the identified data into multiple data fragments. Step 94 generates a packet for transmitting each data fragment. Each packet includes the data fragment and an endpoint identifier that identifies a bundle head.

At step 96, the node transmits the multiple data packets to multiple remote access units. At step 98, the multiple remote access units receive the multiple data packets and determine the appropriate bundle head based on the endpoint identifier. Additionally, at step 98, the multiple remote access units transmit the data packets to the bundle head. Finally, at step 100, the bundle head reassembles the multiple data fragments contained in the multiple data packets into the original data. The reassembled original data is then transmitted from the bundle head to the destination at step 102.

Figure 6A:
FIG. 6A illustrates an embodiment of a data packet that is to be transmitted across multiple communication links.
Figure 6B:
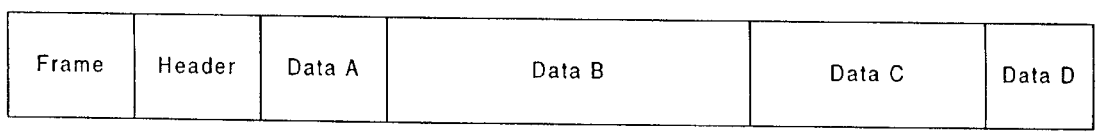
FIG. 6B illustrates the data packet of FIG. 6A in which the data is divided into four fragments.
Figure 6C:
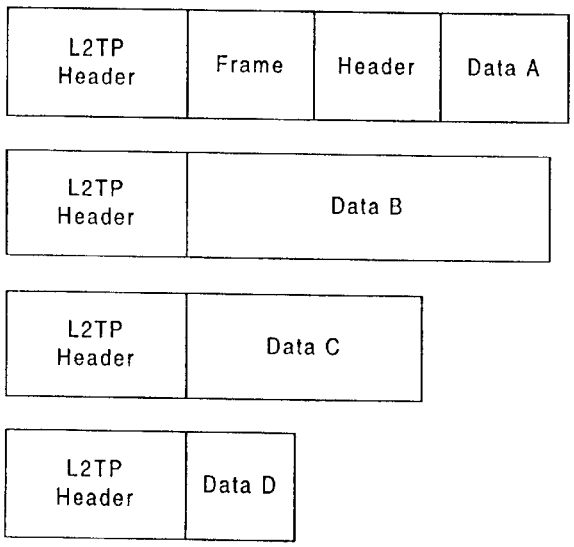
FIG. 6C illustrates an embodiment of four separate L2TP data packets, one for each of the four fragments shown in FIG. 6B.

FIG. 6A illustrates an embodiment of a data packet that is to be transmitted across multiple communication links. In a particular embodiment of the invention, data packet 110 is transmitted using the Point-To-Point Protocol (PPP) (Network Working Group, Request for Comments: 1661, July 1994). FIG. 6B illustrates the data packet of FIG. 6A in which the data is divided into four fragments, labeled Data A, Data B, Data C, and Data D. The packet data may be divided into any number of fragments depending on the number of different communication links and the available bandwidth on each link. Similarly, the size of the different fragments will vary depending on the number of communication links and the available bandwidth on each link. FIG. 6C illustrates an embodiment of four separate L2TP data packets, one for each of the four data fragments shown in FIG. 6B. The first L2TP data packet includes an L2TP header, the frame and header information from packet 110, and data fragment "A". The remaining three L2TP data packets include an L2TP header and a data fragment. The remaining three L2TP data packets do not include the frame and header information from packet 110 because the frame and header information was already included in the first L2TP data packet. The L2TP headers contain sequence numbers, not shown, which are used by the bundle head to properly reassemble the original data.

Embodiments of the invention may be represented as a software product stored on a machine-readable medium (also referred to as a computer-readable medium or a processor-readable medium). The machine-readable medium may be any type of magnetic, optical, or electrical storage medium including a diskette, CD-ROM, memory device (volatile or non-volatile), or similar storage mechanism. The machine-readable medium may contain various sets of instructions, code sequences, configuration information, or other data. For example, the procedures described above for communicating data across multiple communication links can be stored on the machine-readable medium. Those of ordinary skill in the art will appreciate that other instructions and operations necessary to implement the described invention may also be stored on the machine-readable medium.

In alternative embodiments, the present invention may be applicable to implementations of the invention in integrated circuits or chip sets, wireless implementations, switching systems products and transmission systems products. For purposes of this application, the term switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of identifying a bundle head in response to a request to establish a multilink connection, the method comprising the steps of:

determining an endpoint identifier associated with the received connection request;

generating a message to identify other devices servicing the same endpoint identifier; and establishing the current device as bundle head for the endpoint identifier if a timeout period expires and no other device is identified as servicing the same endpoint identifier.

2. The method of claim 1 further including the step of generating a random number that is included in the message generated to identify other devices servicing the same endpoint identifier.

3. The method of claim 2 wherein the current device is established as bundle head if a timeout period expires and the random number generated by the current device is lower than random numbers generated by other devices.

4. The method of claim 1 further including the step of broadcasting a message indicating that the current device is the bundle head for the endpoint identifier if a timeout period expires and no other device is identified as servicing the same endpoint identifier.

5. The method of claim 1 wherein the step of establishing the current device as bundle head for the endpoint identifier includes storing the endpoint identifier in a table contained within the current device.

6. The method of claim 5 wherein the step of establishing the current device as bundle head for the endpoint identifier includes storing an arithmetic sum associated with the endpoint identifier in the table contained within the current device.

7. The method of claim 1 wherein the method is performed by a switching system product.

8. The method of claim 1 wherein the method is performed by a transmission system product.

9. A method of identifying matching endpoint identifiers in a network device, the method comprising the steps of:

receiving a message to identify a bundle head associated with an endpoint identifier;

calculating an arithmetic sum associated with the endpoint identifier contained in the received message;

determining whether the calculated arithmetic sum matches an arithmetic sum in a table contained in the network device; and determining whether the endpoint identifier matches an endpoint identifier contained in the table if the calculated arithmetic sum matches an arithmetic sum contained in the table.

10. The method of claim 9 further including the step of transmitting a message indicating that the network device is the bundle head for the endpoint identifier if the calculated arithmetic sum matches an arithmetic sum contained in the table and the endpoint identifier matches an endpoint identifier contained in the table.

11. The method of claim 9 wherein the method is performed by a switching system product.

12. The method of claim 9 wherein the method is performed by a transmission system product.

13. An apparatus for discovering a bundle head in response to a request to establish a multilink connection, the apparatus comprising:
an endpoint identification mechanism configured to determine an endpoint identifier associated with the received connection request;
a message generator coupled to the endpoint identification mechanism, wherein the message generator is configured to generate a message to identify other devices servicing the same endpoint identifier; and
a mechanism configured to establish the apparatus as bundle head for the endpoint identifier if a timeout period is reached and no other device is identified as servicing the same endpoint identifier.

14. The apparatus of claim 13 further including a random number generator configured to generate a random number that is included in the message generated to identify other devices servicing the same endpoint identifier.

15. The apparatus of claim 14 wherein the apparatus is established as bundle head if a timeout period expires and the random number generated by the random number generator is lower than random numbers generated by other devices.

16. The apparatus of claim 13 further including a table in which an endpoint identifier is stored if the apparatus is established as bundle head for the endpoint identifier.

17. The apparatus of claim 16 wherein the table further stores an arithmetic sum associated with the endpoint identifier if the apparatus is established as bundle head for the endpoint identifier.

18. The apparatus of claim 13 wherein the apparatus is a switching system product.

19. The apparatus of claim 13 wherein the apparatus is a transmission system product.

20. A medium readable by a machine, the medium having stored thereon a sequence of instructions which, when executed by the machine, cause the machine to:
determine an endpoint identifier associated with a received request to establish a multilink connection;
generate a message to identify other devices servicing the same endpoint identifier; and
establish the current device as bundle head for the endpoint identifier if a timeout period expires and no other device is identified as servicing the same endpoint identifier.

21. The medium of claim 20 further including a sequence of instructions which, when executed by the machine, cause the machine to generate a random number that is included in the message generated to identify other devices servicing the same endpoint identifier.

22. The medium of claim 21 further including a sequence of instructions which, when executed by the machine, cause the machine to establish the current device as bundle head if a timeout period expires and the random number generated by the current device is lower than random numbers generated by other devices.

23. The medium of claim 20 further including a sequence of instructions which, when executed by the machine, cause the machine to transmit a message indicating that the current device is the bundle head for the endpoint identifier if a timeout period expires and no other device is identified as servicing the same endpoint identifier.

24. The medium of claim 20 wherein the medium is utilized by a switching system product.

25. The medium of claim 20 wherein the medium is utilized by a transmission system product.

* * * * *